(12) United States Patent
Doerr

(10) Patent No.: US 7,003,198 B2
(45) Date of Patent: Feb. 21, 2006

(54) INTEGRATEABLE BAND FILTER USING WAVEGUIDE GRATING ROUTERS

(75) Inventor: Christopher Richard Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 112 days.

(21) Appl. No.: 10/783,306

(22) Filed: Feb. 20, 2004

(65) Prior Publication Data

US 2005/0053332 A1    Mar. 10, 2005

Related U.S. Application Data

(63) Continuation-in-part of application No. 10/657,846, filed on Sep. 9, 2003, which is a continuation-in-part of application No. 10/657,863, filed on Sep. 9, 2003, which is a continuation-in-part of application No. 10/657,862, filed on Sep. 9, 2003.

(51) Int. Cl.
*G02B 6/34* (2006.01)

(52) U.S. Cl. .............................. 385/37; 385/10; 385/15
(58) Field of Classification Search ................ None
See application file for complete search history.

(56) References Cited

U.S. PATENT DOCUMENTS

| | | | |
|---|---|---|---|
| 5,488,500 A * | 1/1996 | Glance | 398/85 |
| 5,745,618 A | 4/1998 | Li | |
| 6,219,471 B1 | 4/2001 | Doerr | |
| 6,240,118 B1 * | 5/2001 | Doerr et al. | 372/64 |
| 6,519,062 B1 * | 2/2003 | Yoo | 398/49 |
| 6,603,898 B1 | 8/2003 | Doerr | |
| 2002/0063928 A1 * | 5/2002 | Hansen et al. | 359/130 |

OTHER PUBLICATIONS

Doer et al. 'Integrated Band Demultiplexer Using Waveguide Grating Routers', IEEE Photonics Technolxy Letters. vol. 15. No. 8., Aug. 2003, pp. 1088-1090.*
Y. Doi, et al., "Flat-Top High Responsivity 8-Channel CWDM Photoreceiver Using Silica-Based AWG With Multimode Output Waveguides", ELOC 2003.
C. R. Doerr et al., "Integrated Band Demultiplexer Using Waveguide Grating Routers", IEEE Photonics Technology Letters, vol. 15, No. 8, Aug. 2003, pp. 1088-1090.
C. R. Doerr et al., "Cross-Connect-Type Wavelength Add-Drop Node With Integrated Band Muxes, Interleavers, and Monitor", Opt. Fib. Comm. Conf., Mar. 23, 2003.
Y. Inoue, "Low Crosstalk 4-Channel Coarse WDM Filter Using Silica-Based Planar-Lightwave-Circuit", OFC, 2002, pp. 75-76.
C. R. Doerr et al., "Dynamic Wavelength Equalizer in Silica Using the Single-Filtered-Arm Interferometer", IEEE Photon. Technol. Lett., vol. 11, pp. 581-583.

(Continued)

*Primary Examiner*—Kaveh Kianni

(57) ABSTRACT

The inventors propose herein a novel band filter design for planar lightwave circuits. In one embodiment of the present invention, the band filter includes two waveguide grating routers interconnected by a third waveguide grating, wherein waveguides comprising the third waveguide grating have unequal path lengths. In addition, the waveguides in the third grating are partitioned into sets of adjacent waveguides wherein each set corresponds to a particular wavelength band for the filter. The individual sets of waveguides are spaced at their connection to the second waveguide grating router such that optical signals within predetermined, different optical wavelength bands are routed to different output ports of the band filter. Some of the advantages of this novel band filter include compactness, sharp passband corners, low spectral ripple, and a lack of chromatic dispersion.

9 Claims, 7 Drawing Sheets

OTHER PUBLICATIONS

C. R. Doerr, "Planar Lightwave Devices for WDM", in Optical Fiber Telecommunications IVA, Academic Press, San Diego, pp. 423-427, 2002.

T. Nakazawa et al., "Compact CWDM Demultiplexer With a Transmission Grating Buried in Silica Waveguide", ECOC-IOOC 2003 Proceedings, vol. 2, paper Tu 1.2.2.

* cited by examiner

INTEGRATEABLE BAND FILTER USING WAVEGUIDE GRATING ROUTERS

CROSS-REFERENCE TO RELATED APPLICATIONS

This application is a continuation-in-part of U.S. patent application Ser. No. 10/657,846, Ser. No. 10/657,863, and Ser. No. 10/657,862 all filed concurrently on Sep. 9, 2003.

FIELD OF THE INVENTION

This invention relates to the field of optical band filters and, more specifically, to integrated optical band filters having reduced ripple.

BACKGROUND OF THE INVENTION

A band filter is a device that is able to separate an incoming optical spectrum into bands (i.e., when used as a demultiplexer) or combine separate optical bands into an output optical spectrum (i.e., when used as a multiplexer), ideally with sharp passband corners. Each band includes one or more optical channels from a multiplexed signal having a plurality of separate optical channels. Band filters are useful in both dense (D) and coarse (C) wavelength-division multiplexed (WDM) systems. In DWDM systems, band filters are typically used for de/multiplexing with a high spectral efficiency or for permitting the use of narrowband optical amplifiers, dispersion compensators, add-drop filters, etc. In CWDM systems, band filters are typically used for de/multiplexing without transmitter temperature control.

In current optical systems, a substantial portion of the implemented band filters are based on thin-film interference filters especially in CWDM applications. Thin-film interference filters typically have low loss over wide passbands. Thin-film interference filters also exhibit significant chromatic dispersion; they require more than ten cavities to achieve sharp passband corners which increases the filter size and complexity appreciably; and they typically require a cascade of elements to demultiplex more than two bands. As these filters are assembled into the final band filter package, they require extensive characterization and matching, tedious hand assembly, and expensive hermetic packages making mass production on any scale expensive.

Band filters based on bulk gratings have also been proposed. This type of band filter can be dispersion-free and can de/multiplex more than two bands without a cascade of elements. Bulk grating band filters also exhibit large form factors and, like thin-film filters, require tedious hand assembly and expensive hermetic packages. In addition, these filters exhibit more loss than their thin-film counterparts.

Band filters based on planar lightwave circuits (PLCs) have also been proposed. In contrast to the thin-film filter technology and the bulk grating filter technology described above, silica waveguide PLCs do not require hermetic packaging or internal optical alignment. PLC band filters are capable of being dispersion-free, and they exhibit sharp passband corners. However, previously proposed band filters based on PLC technology utilized cascaded Mach-Zender Interferometers (MZI), which are exceedingly large in form factor, are limited to de/multiplex only a few flat bands, and usually lack sharply defined passband corners. For CWDM applications in particular, the limitation on the number of bands arises because these filters are designed with a constant frequency difference between de/multiplexer channels rather than a constant wavelength difference as dictated by the CWDM scheme. One example of a four channel MZI-based CWDM filter is shown in an article by Y. Inoue et al. entitled "Low-crosstalk 4-channel coarse WDM filter using silica-based planar-lightwave-circuit," Optical Fiber Conference Digest, Paper TuK6, pp. 75–76, Mar. 19, 2002.

SUMMARY OF THE INVENTION

The present invention advantageously provides a compact, easy to fabricate, reduced ripple (i.e., substantially flat passband), low loss band filter that is capable of being constructed in planar lightwave circuit (PLC) technology.

In one embodiment of the present invention, a band filter includes two waveguide grating routers (WGRs) connected by a plurality of waveguides, wherein the plurality of waveguides is partitioned into a plurality of sets, each set including more than one waveguide, and the waveguides in a set having substantially equal path lengths within that set. This type of interconnection between the two waveguide grating routers is known as a zero-order grating or a waveguide lens. The connecting waveguides are spaced at their connection to each waveguide grating router such that optical signals with predetermined optical frequency ranges are routed to selected, respective output ports on the second waveguide grating router.

In one embodiment of the present invention, each of the sets of connecting waveguides are contiguous at their connection to a first waveguide grating router and have increased gaps between bands at their connection to a second waveguide grating router. That is, an inter-set separation at the connection to the first waveguide grating router is substantially identical to the interwaveguide (intra-set) separation, whereas the inter-set separation at the second waveguide grating router is greater than the interwaveguide (intra-set) separation within each set.

In an alternate embodiment of the present invention, a planar lightwave circuit includes at least two substantially identical band filters of the present invention constructed on a single chip to save cost. In one embodiment, the planar lightwave circuit has a size equal to 8.7 cm×1.0 cm.

Further compactness especially suited for, although not limited exclusively to, CWDM operation, is achieved in accordance with another aspect of this invention by replacing the waveguide lens interconnecting the two waveguide grating routers with a non-zero order waveguide grating utilizing unequal length waveguides to interconnect the two wavelength grating routers. Length inequality is conditioned on a path length difference for adjacent waveguides being related to an integer number of a wavelength intermediate to the two different central wavelengths supported for transmission by the adjacent waveguides. In addition to being more compact, the use of shorter waveguides in the interconnecting waveguide grating reduces the amount of accumulated phase errors caused by fabrication which, in turn, results in smoother passbands in the band filter response.

In one exemplary embodiment, this further compacted structure is realized by a plurality of interconnecting waveguides, each waveguide comprising a plurality of curved and substantially straight sections arranged in a substantially parabolic shape.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Optical filters based on waveguide grating router structures have been described in the art. In particular, one such filter wherein two waveguide grating routers are coupled together by a region including two additional waveguide gratings separated by a plurality of optical elements such as phase shifters, switches and the like is described in U.S. Pat. No. 6,603,898 entitled "Apparatus and method for achieving a smooth spectral response optical filter", issued Aug. 5, 2003, which is incorporated herein by reference in its entirety.

Although various embodiments of the present invention herein are being described with respect to a 1×3 optical band filter, it will be appreciated by those skilled in the art informed by the teachings of the present invention that the concepts of the present invention are applicable to band filters comprising substantially any number or combination of inputs and outputs.

Figure 1:
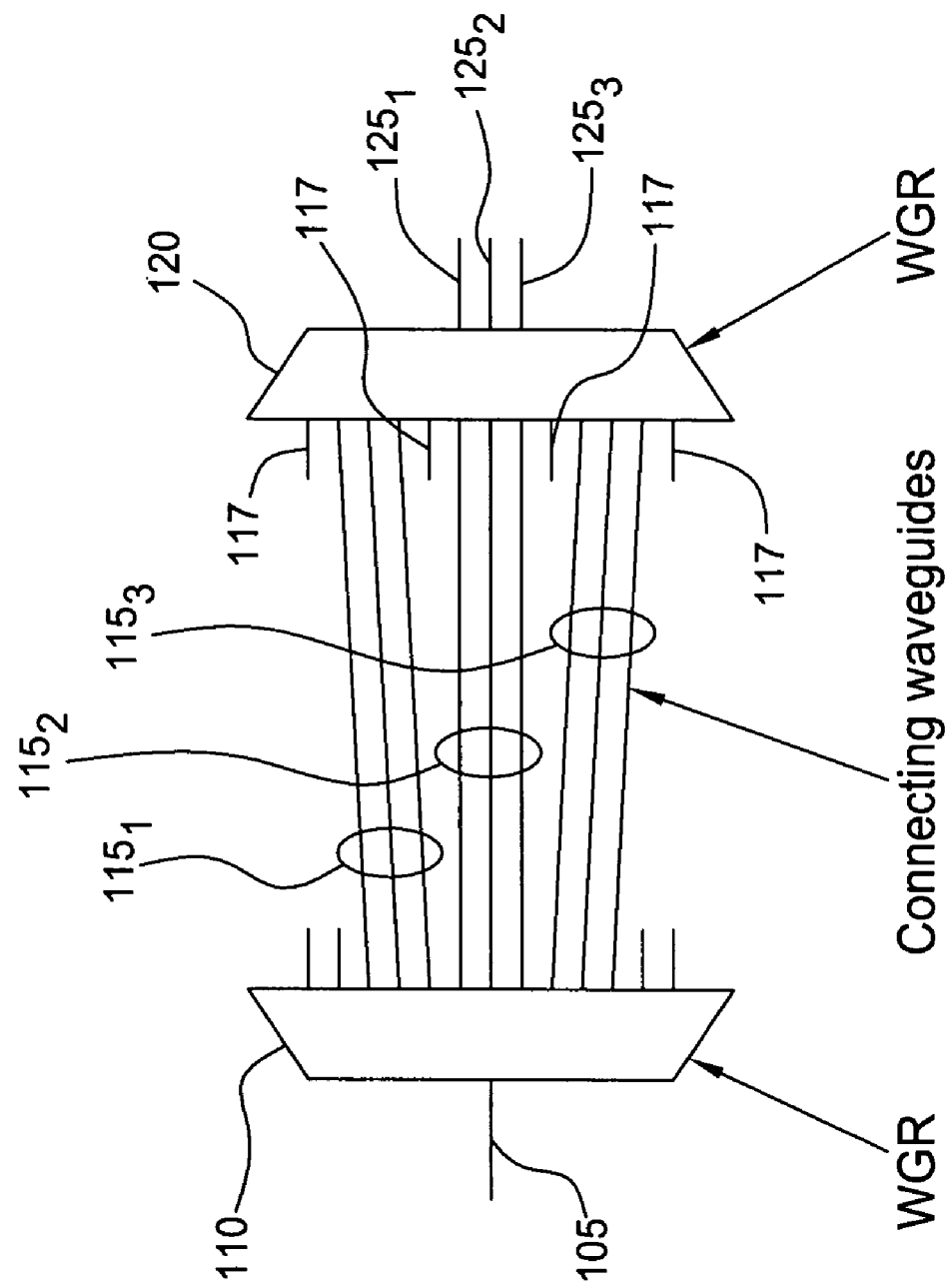
FIG. 1 depicts a high-level block diagram of one embodiment of a band filter in accordance with the present invention.

FIG. 1 depicts a high-level block diagram of one embodiment of a band filter in accordance with the present invention. The band filter 100 of FIG. 1 illustratively comprises one input waveguide 105, an input waveguide grating router (WGR) 110, a plurality of connecting waveguides 115, a plurality of dummy waveguides 117, an output WGR 120 and three output waveguides $125_1$, $125_2$ and $125_3$ (collectively output waveguides 125). Although in FIG. 1, the band filter 100 is being depicted and described as comprising one input waveguide 105 and three output waveguides $125_1$, $125_2$ and $125_3$ and as such functioning as a demultiplexer, a band filter in accordance with the present invention may also be used in reverse (i.e., using the three waveguides $125_1$, $125_2$ and $125_3$ as the input and the one waveguide 105 as the output) and function as a multiplexer.

The band filter 100 of the present invention is a novel arrangement of two substantially perfectly sampled waveguide grating routers (WGRs) wherein a well-known waveguide grating router in the art includes two star couplers connected by a plurality of waveguides forming a grating region. Sampling is described in U.S. Pat. No. 6,603,898 entitled "Apparatus and method for achieving a smooth spectral response optical filter", issued Aug. 5, 2003 to Doerr, which is incorporated by reference herein in its entirety.

Briefly stated, the design technique of sampling optimizes the loss and ripple in the spectral response of an optical filter including a waveguide grating connected to a star coupler. The smoothest spectral response is achieved by choosing the number of grating arms to be less than or equal to the number required to occupy or fill the central Brillouin zone of a side (input port or output port side) of the star coupler. Exactly filling the central Brillouin zone with the grating arms minimizes the filter loss while exhibiting ideally zero spectral ripple. This is known as substantially perfectly sampling and is the preferred choice for the current filter design.

As shown in FIG. 1, the plurality of connecting waveguides is illustratively divided into three sets of waveguides $115_1$, $115_2$ and $115_3$. The plurality of waveguides forms a grating region. Each set of waveguides includes two or more waveguides supporting wavelength transmission within a band of wavelengths. The set of waveguides thereby corresponds to a predetermined wavelength band for the band filter. In one embodiment of this invention, all waveguides in each particular one of the sets $115_1$, $115_2$ and $115_3$ of the plurality of connecting waveguides 115 of the band filter 100 have substantially equal path lengths within the particular wavelength band.

A band filter in accordance with the present invention comprises a number of individual sets of connecting waveguides at least equal to the number of bands that an input optical spectrum is to be separated into by the band filter. Each of the sets $115_1$, $115_2$ and $115_3$ of the plurality of connecting waveguides 115 is comprised of a number of waveguides having substantially equal path lengths within the set corresponding to a specific wavelength band that the set is intended to separate and propagate. In FIG. 1, the upper set of connecting waveguides $115_1$ is depicted as being curved, the center set of connecting waveguides $115_2$ is depicted as being straight, and the lower set of connecting waveguides $115_3$ is depicted as being curved.

The inlets of the connecting waveguides 115 are continuous in their spacing at their connection to the output side of WGR 110 and have larger gaps between bands at their connection to the input side of WGR 120. That is, in the connection to WGR 110, adjacent waveguides in the sets are separated from each other and from adjacent sets by an amount that is substantially equal for all waveguides and in contrast to the connection to WGR 120 where adjacent sets are separated from each other by an amount that is greater than the interwaveguide separation within a set. The interwaveguide separation within a particular set is also known as an intra-set separation. In connecting to WGR 110, adjacent waveguides, whether in the same set or in two adjacent sets, are separated by substantially the same interwaveguide separation. In connecting to WGR 120, a greater interwaveguide separation occurs between two waveguides, each in a different adjacent set, than between two adjacent waveguides in the same set. As a result, the inter-set separation is greater than the interwaveguide or intra-set separation within any set of waveguides.

Illustratively, the input side of WGR 110 has one input waveguide, and the output side of WGR 120 has as many output waveguides as there are bands (illustratively, three output waveguides). The output waveguides 125 are spaced apart by an amount appropriate to insure adequate or optimum reception of each wavelength band separated by the band filter. This spacing also takes into account the lensing magnification factor of the WGR 120.

The connecting waveguides 115 are disposed to perfectly or slightly over-sample the optical signal spectrum presented to the WGR 110. Connecting waveguides are positioned and formed such that the bandwidths of adjacent waveguides overlap to some degree so that individual optical signals propagate through several adjacent waveguides simultaneously. For substantially ripple free operation, the number of waveguide grating arms in each WGR 110 and 120 is approximately equal to or less than the number of connecting waveguides it would take to fill the central Brillouin zone of each WGR star coupler that interfaces with the connecting waveguide. It should be noted that, for optimum performance, the gaps between the bands of connecting waveguides should be an integer number of the connecting waveguide inlet spacing such that the dummy waveguides 117 inserted in the gaps between the waveguide sets on the input side of WGR 120 are able to make the mutual-coupling-induced aberrations for all connecting waveguide inlets substantially identical. However, the gaps do not have to be an integer of inlet spacing in order for the band filter to operate properly.

Figure 2:
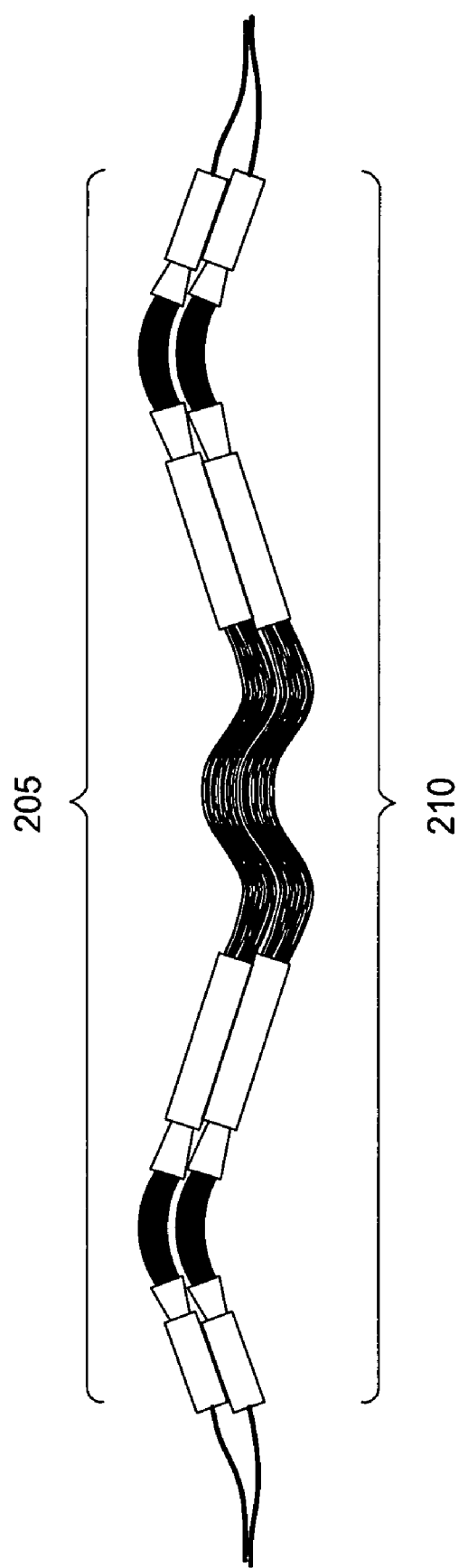
FIG. 2 depicts a more detailed diagram of the band filter of FIG. 1 constructed on a single chip in planar lightwave circuit (PLC) technology.

FIG. 2 depicts a more detailed diagram of the band filter 100 of FIG. 1 constructed on a single chip in silica-on-silica PLC technology. FIG. 2 illustratively depicts two substantially identical band filters 205 and 210, each including the elements described above for the band filter 100 of FIG. 1. In FIG. 2, two band filters 205 and 210 are depicted as being constructed on a single chip to save packaging costs and because a multiplexer and demultiplexer are often needed in the same location as in the case of a collocated transmitter and receiver, respectively. The band filters 205 and 210 of FIG. 2 are illustratively depicted as functioning additionally as band demultiplexers and are referred to herein as either band filters or band demultiplexers without any intended limitation or loss of generality. The band demultiplexers 205 and 210 in FIG. 2 as realized also share fiber assemblies in order to save cost. The size of the PLC chip of FIG. 2 is 8.7 cm×1.0 cm.

Each of the band demultiplexers 205 and 210 in FIG. 2 splits the center (C) and long (L) optical band into five 17-channel (100-GHz-spacing) bands with dead zones of 3 channels (i.e., a 17-skip-3 filter). Each band has 10 connecting waveguides (200-GHz spacing), and the gaps between bands at their connection to the output WGR are 4 spacings (i.e., 3 dummy waveguides between bands). The output of the output WGR has 5 output waveguides spaced by 3 inlet spacings, wherein each output waveguide corresponds to a particular wavelength band filtered and separated by the band demultiplexer. There are illustratively, M=75 arms in each WGR and the WGR free-spectral range is 15200 GHz. It should be noted that additional arms are provided in each WGR in order to increase the spectral response of the WGR and thereby mitigate loss of each router.

The spectral sampling coefficient, s, for the connecting waveguides is characterized according to equation one (1), which follows:

$$s = \frac{R}{Ma} \frac{\lambda}{n_{fs} b}. \qquad (1)$$

where R depicts the radius of the free-space region from which the connecting waveguides emanate, λ depicts the wavelength, $n_{fs}$ is the effective refractive index of the free-space region, M is the number of arms in each WGR, a is the center-to-center spacing between inlets from the left and right gratings at their respective star couplers, and b is the center-to-center spacing between inlets from the middle grating (i.e., the connecting waveguides) at the star couplers of the routers. For each of the demultiplexers 205 and 210 depicted in FIG. 2, the spectral sampling coefficient, s, for the connecting waveguides ranges from 1.07 to 1.01 from the shortest to the longest wavelength. In comparison, a conventional Gaussian-passband WGR demultiplexer has spectral sampling coefficient of s≈0.5. A spectral sampling coefficient of s≧1 results in a substantially ripple-free passband. The values of λ, $n_{fs}$, and b vary from connecting waveguide to connecting waveguide.

It should be noted that the increased gap between the connecting waveguides at the band boundaries in a band filter may cause the outermost waveguides in each band to experience a slightly different amount of etching during the core definition, which results in these waveguides being no longer perfectly in phase with their neighboring waveguide in the band. This, in turn, results in ripples at the band edges. This effect is especially pronounced in present experimental practice where the connecting waveguides within each set have the same path length, thereby resulting in long connecting waveguides. To avoid this effect, in a band filter of the present invention, dummy waveguides are located within the gaps between adjacent sets of waveguides to fill the space as much as possible while simultaneously avoiding mutual coupling once the waveguides start bending. Based on simulation results, the waveguide grating arm lengths were adjusted in the design to minimize aberrations due to the connecting waveguide inlet mutual coupling.

To mitigate loss, segmentation is used in the six inner slab-to-waveguide-array junctions in the star couplers of the WGRs. Segmentation is the placement of strips of core running perpendicular to the waveguides with an approximately constant center-to-center spacing but a progressively decreasing width as the distance from the free-space region increases. Such segmentation is described in U.S. Pat. No. 5,745,618 entitled "Optical device having low insertion loss", issued Apr. 28, 1998 to Li, which is incorporated herein by reference in its entirety.

Each connecting waveguide is comprised of a group of straight waveguide sections, curved waveguide sections, and transition sections between the straight and curved sections in order to realize the desired shape and disposition of a particular waveguide. In order to mitigate fabrication and polarization sensitivities within each connecting waveguide set, the sum of the lengths of the straight waveguides, the sum of the lengths of the transitions between straight waveguides and curved waveguides, and the sum of the lengths of the curved waveguides (all having the same bend radius) are all individually related on an approximate linear basis from waveguide to waveguide.

In an example from experimental practice, a PLC chip, such as the PLC chip depicted in FIG. 2, was manufactured using low-pressure chemical vapor phase deposition (LPCVD) and reactive ion etching. The PLC chip was diced out from a wafer, and fiber ribbon assemblies were glued to both sides. Despite the above-mentioned efforts to make the immediate environment for the outermost waveguides in each band the same as the inner ones, it was determined after manufacture that the outermost waveguides were slightly too long in path length and exhibited a ~0.8 dB ripple on the long-wavelength edge of each band. The inaccuracy was measured by using small chrome heaters on every connecting waveguide. By driving the heaters, it was determined that the outermost waveguides were slightly long in path length. A possible explanation is that the waveguide density is higher for the inner waveguides, and thus there is more etchant available there, causing increased undercutting during the core definition. The outermost waveguides, having less undercutting, would have slightly higher propagation constants, appearing to have longer path lengths.

To adjust the path lengths of the PLC chip, the respective chrome strips were hyperheated (heating up the waveguides to a temperature high enough to modify the underlying glass chip area) to permanently readjust the path lengths, significantly reducing the spectral ripple of the band filter. Because this ripple is consistent from device to device and wafer to wafer, it can be corrected in future manufacture and design by slightly shortening the outermost connecting waveguides in each band. The effect can be ameliorated, if not substantially eliminated, by using shorter connecting waveguides as described herein.

Figure 3:
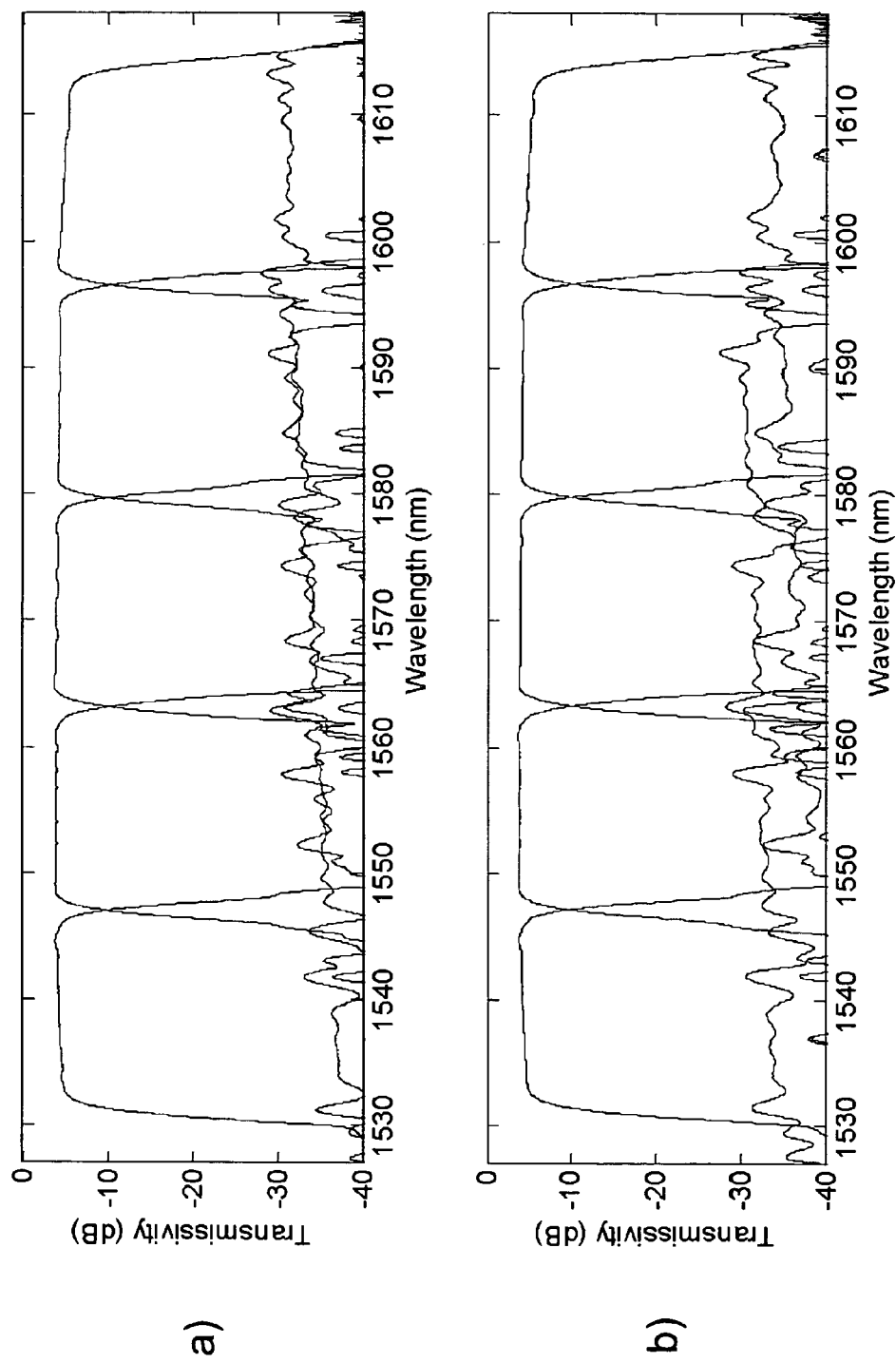
FIG. 3a graphically depicts the measured transmissivities for the upper band demultiplexer of the PLC chip of FIG. 2.
FIG. 3b graphically depicts the measured transmissivities for the lower band demultiplexer of the PLC chip of FIG. 2.

FIG. 3a and FIG. 3b graphically depict the measured transmissivity for the upper 205 and the lower 210 band demultiplexers, respectively, of the PLC chip of FIG. 2. In FIGS. 3a and 3b, the transmissivity of the respective band demultiplexer is plotted versus wavelength. From FIGS. 3a and 3b, it is evident that the connecting waveguides are adapted to provide low-loss, substantially ripple free propagation of optical signals within one or more predetermined optical wavelength bands.

In the fabricated de/multiplexers described above, the insertion loss (fiber-to-fiber, including one connector) for each device is less than approximately 4.0 dB for the center wavelength bands, less than approximately 5.0 dB for the low-wavelength band, and less than approximately 5.5 dB for the long-wavelength band. The polarization-dependent loss is less than approximately 0.15 dB. The 0.3-dB bandwidth is 1670 GHz, and the 20-dB bandwidth is 2210 GHz, giving a shape factor ($BW_{20dB}/BW_{0.3dB}$) for the band filter of 1.32. This band filter is designed as a 17-skip-3 filter, but with this shape factor it is good enough to be a 5-skip-0 filter. More specifically, the filter shape of the present invention is appropriate to have 5 channels per band with no wavelength channel position used between bands. In such a case, no wavelength channel positions are lost.

Figure 4:
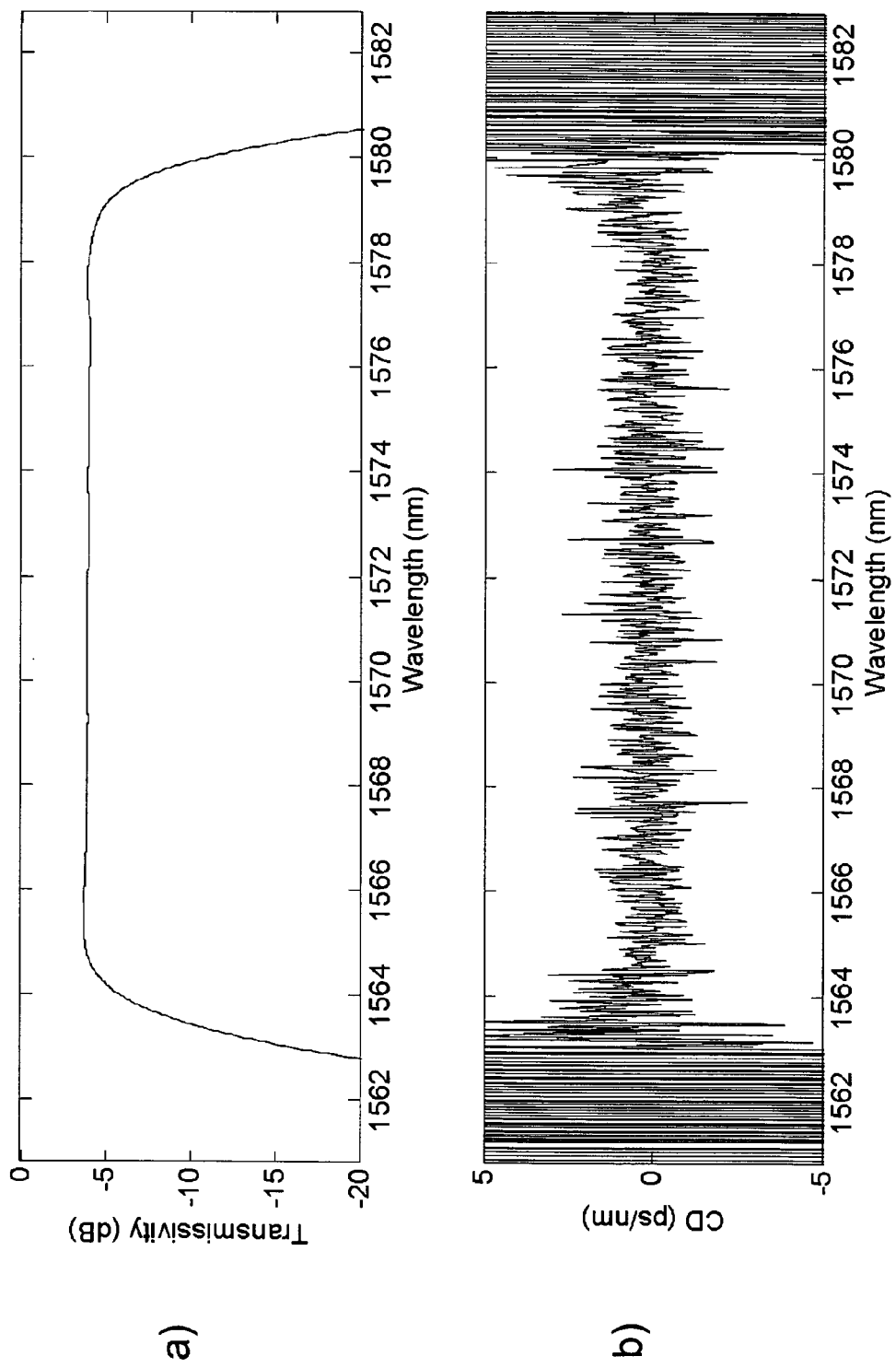
FIG. 4a graphically depicts the measured transmissivity of the central band of the lower band demultiplexer of the PLC chip of FIG. 2.
FIG. 4b graphically depicts the chromatic dispersion of the central band of the lower band demultiplexer of the PLC chip of FIG. 2.

FIG. 4a and FIG. 4b graphically depict the measured transmissivity and chromatic dispersion, respectively, of the central band of the lower band demultiplexer 210 of the PLC chip of FIG. 2. The chromatic dispersion magnitude for the lower band demultiplexer 210 is extremely small, less than approximately 1 ps/nm across the central band. The adjacent band crosstalk is less than approximately −23 dB, and the nonadjacent band crosstalk is less than approximately −34 dB.

As described above, a band filter or de/multiplexer comprises two waveguide gratings connected by a plurality of spaced-apart waveguides forming a grating, also known as a waveguide lens. The connecting grating waveguides described above are designed to have substantially equal lengths at least within a set of waveguides grouped together to correspond to a particular wavelength band of the filter. In experimental practice, this band de/multiplexer exhibits flat-top passbands having sharp passband corners with exceptionally low loss.

Unfortunately, when these design rules are followed for a multi-band or channel (e.g., eight-channel) filter device applicable to CWDM, all three gratings (two in the WGRs and one connecting grating) are long and the resulting filter or de/multiplexer is large. For example, with 0.8% index step silica waveguides, an eight-channel CWDM band filter is unable to be fabricated on a five (5) inch wafer. In addition, phase errors due to fabrication cause ripple at the passband edges with such long connecting waveguides.

Figure 5A:
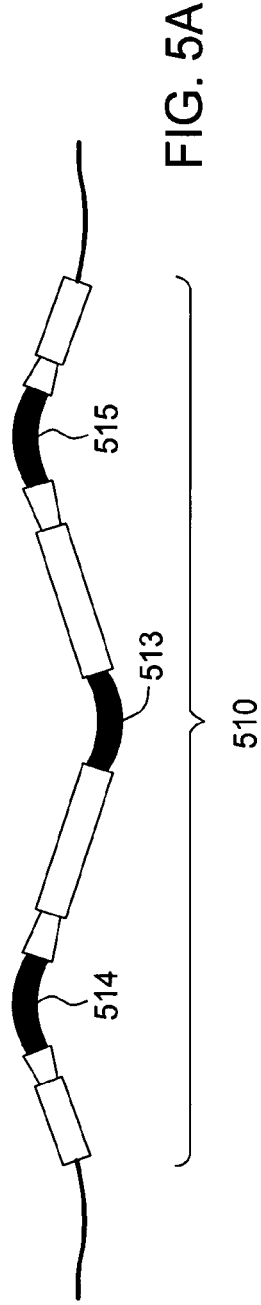
FIGS. 5a and 5b show simplified diagrams of a compact band filter realized in accordance with principles of the present invention.
Figure 5B:
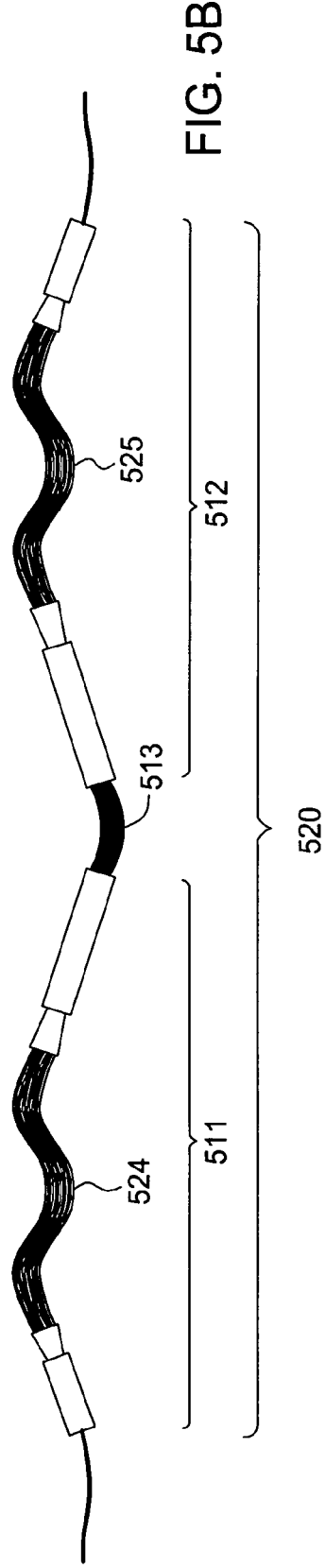

By replacing the waveguide lens by a special waveguide grating, it is possible to shrink the device considerably and create a compact, low-loss, multi-channel, silica-waveguide, CWDM de/multiplexer as shown in FIG. 5b. The resulting de/multiplexer comprises three cascaded waveguide gratings, one in each waveguide grating router and one connecting both waveguide grating routers. It should be understood by those skilled in the art that these teachings are applicable to any WDM band filter such as CWDM or DWDM, for example, although they are described below with reference to a coarse WDM filter.

FIGS. 5a and 5b show different exemplary band filters or de/multiplexers from experimental practice. In FIG. 5a, the filter includes three similar waveguide gratings in cascade; in FIG. 5b the CWDM filter includes a more compact grating connecting the two waveguide grating routers. The filter in FIG. 5a is potentially applicable to the narrower band applications of DWDM, for example.

As shown in FIG. 5b, the eight-band de/multiplexer adapted for CWDM applications comprises two waveguide grating routers connected by eight sets of connecting waveguides forming the special waveguide grating between the two waveguide grating routers. Each set of waveguides includes five waveguides in this example and corresponds to a particular filter band of interest. All the connecting waveguides 513 are evenly spaced at their connection to the left-hand waveguide grating router 511, but these waveguides 513 have gaps of three waveguide spacings, for this example, between each of the waveguide sets at their connection to right-hand waveguide grating router 512. The waveguide spacings of the connecting waveguides at their connections to both waveguide grating routers are chosen so as to perfectly sample the spectra from the waveguide grating routers. Thus the resulting passbands have sharp corners and are ripple-free.

In the example described earlier with respect to FIG. 2, the connecting waveguides within a particular waveguide set were defined as having the same path length. Connecting waveguides within a specific waveguide set of the grating comprise a waveguide grating with a grating order of zero, also called a waveguide lens. A waveguide grating with a low order, typically less than 8, cannot be realized using the compact, parabola-shaped design shown in the waveguide grating routers on the left and right of FIG. 2. This is because the path-length difference is so small in a low-order grating that the waveguides within the grating cannot be separated far enough to uncouple them optically. In order to physically realize low-order gratings, it is necessary to use a more complex combination of waveguide sections, straight and curved, that resembles a letter "w" or the like as is shown in the center waveguide grating of FIG. 2. The actual waveguides shown in the center waveguide grating of FIG. 2 each include five straight sections interleaved with four curved or bend sections. As shown in FIG. 2, the depicted exemplary embodiment includes waveguide sections having the same bend radius for all bends, having the total length of the straight sections and the total length of the bend sections in each waveguide independently change linearly from waveguide to waveguide. These characteristics were utilized to prevent aberrations arising from wavelength, polarization, and fabrication changes.

As already noted, this particular design for the center grating makes the grating fairly long. In CWDM applications, the bands of the CWDM signals cover such a wide spectral range that the grating orders of gratings in the waveguide grating routers on the left and right of FIG. 2 must be designed to be low, that is, at least below order 8, and preferably near zero. This would result in a band filter for CWDM applications based on the inventive principles shown in FIG. 2 having waveguide gratings in both waveguide grating routers similar to the central waveguide grating connecting the routers together. That is, in CWDM applications, the band filter would include three long, letter "w" shaped waveguide gratings in cascade thereby making the overall band filter length far too long.

Compactness can again be realized in band filters, especially for CWDM applications, by replacing the equal path-length waveguides in the center waveguide grating connecting both waveguide grating routers with a special higher order waveguide grating 513 comprising a plurality of waveguide of unequal length. In the example described herein, the special waveguide grating 513 in FIGS. 5a and 5b exhibits a high grating order greater than 8 thereby saving significant device size and reducing phase errors. The compact CWDM band filter shown in FIG. 5b is 80 mm.×5.4 mm. From experimental practice, it has been determined that a high grating order is any order equal to or grater than 5 and the preferred range of high order gratings begins with a grating order at or above 8.

The central grating 513 is special in that the path-length difference between waveguides is non-zero and not necessarily constant across the set of different adjacent waveguides. The path-length difference between adjacent waveguides is related to an integer multiple of an average of the center wavelengths for the adjacent waveguides as given by:

$$L(m) - L(m-1) = \frac{A_{middle}}{2n}[\lambda(m) + \lambda(m-1)] \quad (2)$$

where L(m) is the path length of waveguide m, λ(m) is the center wavelength supported for propagation by waveguide m, n is the waveguide refractive index, and $A_{middle}$ is an integer equal to the grating order of the center waveguide grating 513. It has been discovered that in order for the passbands of the band filter 520 to have negligible ripple, $A_{middle}$ must be less than approximately $A_{left}M_{left}/25$ which is approximately equal to $A_{right}M_{right}/25$, wherein $A_{left}$ and $A_{right}$ are the grating orders of gratings 514 and 515, respectively, and $M_{left}$ and $M_{right}$ are their respective grating-arm numbers (i.e., the number of waveguides that comprise each such grating). The factor of 25 was found empirically via simulation. In the present example from experimental practice for an eight-band (channel) CWDM, a ninth order grating for grating 513 ($A_{middle}$=9) satisfies the condition in equation 2 where $A_{left}$=7, $A_{right}$=5, $M_{left}$=53, and $M_{right}$=75.

It has now been determined that, within grating 513, there can be one or more values for $A_{middle}$. In addition, it has been determined that the non-zero path length difference calculated in equation 2 can be either positive or negative for various adjacent waveguides across grating 513.

In the example from experimental practice, there is an additional path-length difference between waveguides sets of approximately 15 μm. that aids in further size reductions for the band filter. It has been noticed that the non-zero path-length difference for adjacent connecting waveguides within a waveguide set of grating 513 can cause the optical signals to experience some group delay change across the passband. However, the group-delay slope is approximately 10 fs/nm and so the actual group delay in this small filter device is negligible. To minimize the loss, segmentation is employed on all sides of the four star couplers except for the main input (on the far left side of device 520) and output side (on the far right side of device 520).

It may be desirable in certain applications to interchange shorter, higher order gratings 514 and 515 for the longer, more complex shaped, low order waveguide gratings 524 and 525, respectively, as shown in FIG. 5a. In such an application, it is understood that, in accordance with the present invention, high order grating 513 consistent with the conditions presented herein above is utilized to interconnect the two waveguide grating routers including the high order gratings 514 and 515.

Figure 6:
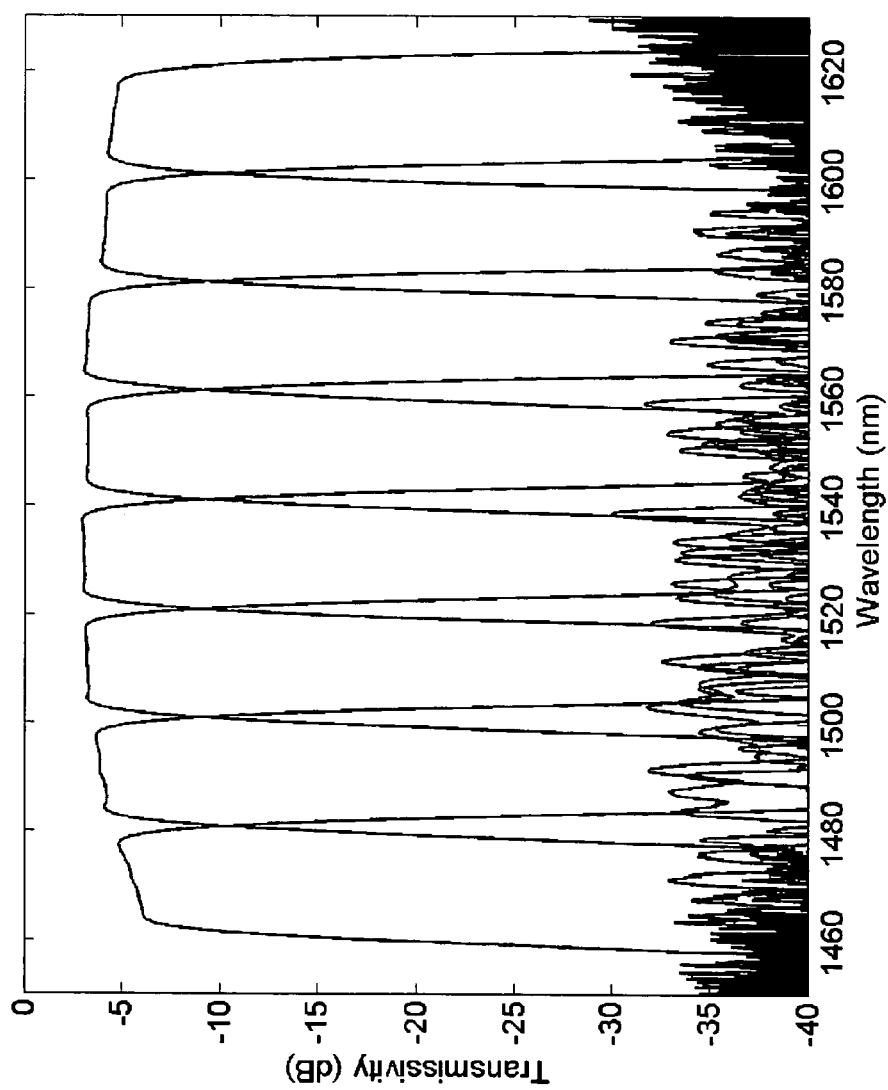
FIG. 6 shows the measured transmissivity spectra for a CWDM de/multiplexer realized in accordance with the exemplary structure shown in FIG. 5b.

The band filter chips were fabricated using the waveguide layout of FIG. 5b in silica waveguides on a silicon substrate using LPCVD for all the layers. The waveguide cores are P-doped to obtain a core-cladding index contrast of 0.80%. In final fabrication, the chip was diced out the wafer and glued to an input fiber and an output fiber ribbon. The band filter chip was measured to determine the transmissivity response versus wavelength shown in FIG. 6.

In experimental practice on the eight-channel CWDM band filter shown in FIG. 5b, the fiber-to-fiber insertion loss including the loss induced by one optical connector ranges from 3.1 dB for channel 4 (i.e., the band between approximately 1520 nm. and 1540 nm.) to 5.5 dB for channel 1 (i.e., the band between approximately 1460 nm. and 1480 nm.). The loss is higher for the outer channels or filter bands because of the decrease in diffraction efficiency for off-center ports in the left and right gratings, gratings 524 and 525, respectively. Shorter wavelengths exhibit even more loss because mutual coupling between the grating waveguides at each star-coupler boundary is lower for shorter wavelengths, thereby further decreasing the diffraction efficiency. This effect is verified by simulation. Such an effect is not normally seen in DWDM de/multiplexers (band filters) because DWDM transmission bands encompass a narrower spectral range than CWDM. It has been determined that the increased loss at short wavelengths is not due to material or waveguide loss (water peak, scattering, etc.).

Figure 7:
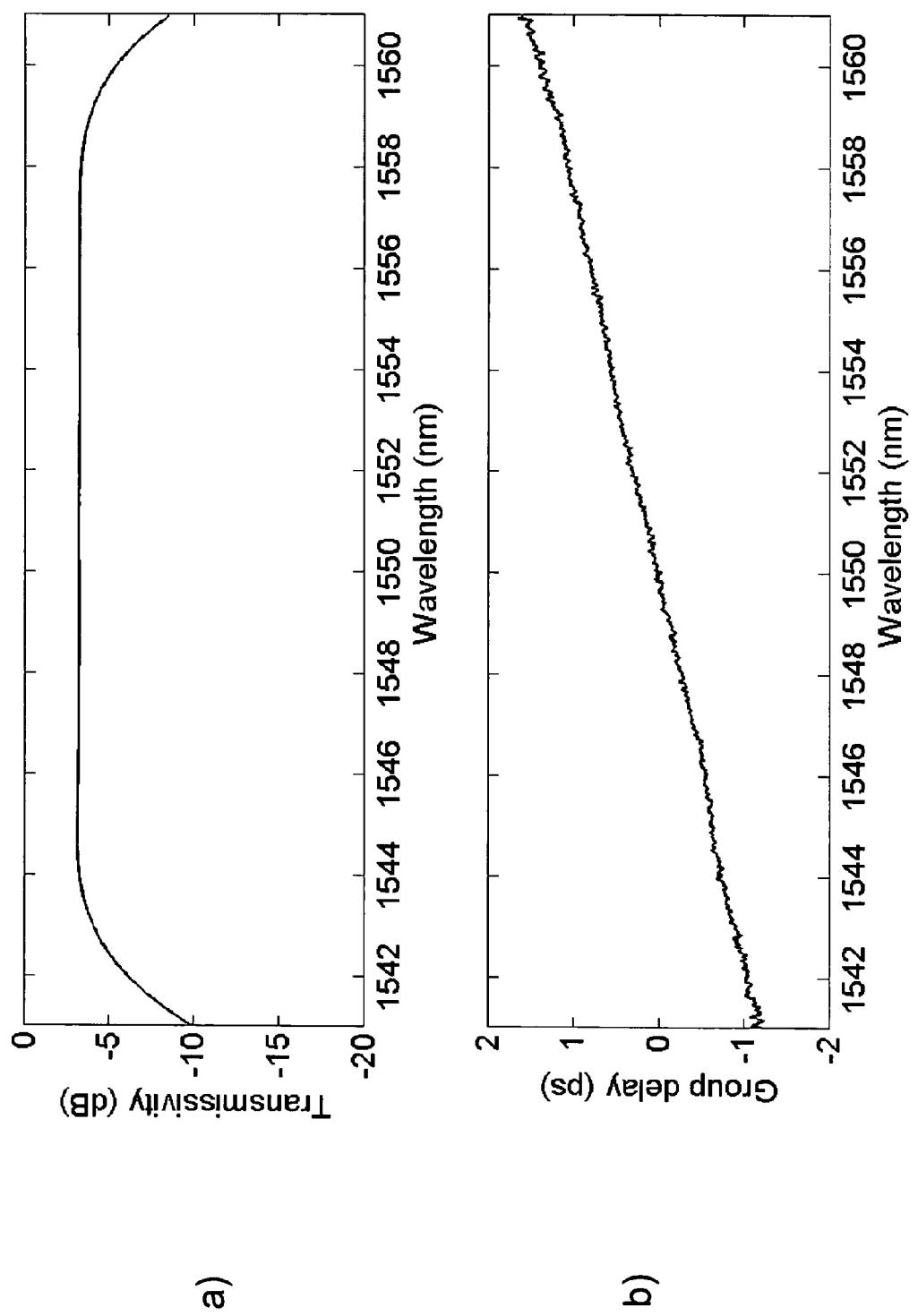
FIGS. 7a and 7b show the transmissivity and group delay for a central band in the exemplary band filter of FIG. 5b.

For the CWDM application, the band filter in FIG. 5b and described above exhibits a channel spacing of 20.0 nm, a 1-dB passband width of 16.5 nm, a crosstalk level of less than −26 dB within ±7 nm of the passband center, and a polarization-dependent loss of less than 0.2 dB. Group-delay ripple within the passband is immeasurably small. There is a constant slope of 0.13 ps/nm group delay across the passband, but this group delay occurs as a result of the chromatic dispersion in the fibers attached to the chip and not the waveguides in the band filter chip itself. These characteristics are shown in FIGS. 7a and b for the band in the filter (de/multiplexer) between 1542 nm. and 1560 nm.

The de/multiplexer was exposed to operating temperature extremes in a refrigerator/oven. The change in the passband of channel 5 (the band shown in FIG. 7) is approximately 0.64 nm. when the operating temperature is slewed between extremes of −5 to +65° C. in CWDM operation. Even with this shift, the required bandwidth of 13 nm for CWDM is still met. Thus, the de/multiplexer realized in accordance with the principles of this invention is available for use without temperature control in a CWDM environment.

While the forgoing is directed to various embodiments of the present invention, other and further embodiments of the invention may be devised without departing from the basic scope thereof. For example, it has been determined that, while it is desirable to have a single grating order exhibited by a set or group of waveguides in the middle grating 513, it is possible to have other sets of waveguides within the element 513 exhibit one or more different grating orders. In other words, the grating order can be varied from one set of waveguides to another, but preferably not within the same set of waveguides. As such, the appropriate scope of the invention is to be determined according to the claims, which follow.

What is claimed is:

1. A band filter for filtering an optical signal having components in one or more passbands of the filter, comprising:
   a first waveguide grating router;
   a second waveguide grating router; and
   a plurality of waveguides connecting the first waveguide grating router to the second waveguide grating router, the plurality of waveguides arranged as a waveguide grating, each waveguide having a center wavelength for supporting transmission of an optical signal;
   wherein the plurality of waveguides is partitioned into at least two sets of waveguides, each set of waveguides corresponding to a particular passband in the band filter, the waveguides in a set having unequal path lengths, and the adjacent waveguides within each set having a path-length difference related to a non-zero integer multiple of a wavelength located between the center wavelengths of the adjacent waveguides.

2. The band filter as defined in claim 1 wherein said band filter includes one input port and at least two output ports, the number of output ports corresponding to the number of waveguide sets, said input port disposed on an input side of the first waveguide grating router for receiving said optical signal comprising a plurality of optical channels, and said output ports disposed on an output side of the second waveguide grating router for outputting at least one channel of the optical signal from each output port.

3. The band filter as defined in claim 2 wherein said optical signal comprising a plurality of optical channels is a coarse wavelength division multiplexed signal.

4. The band filter as defined in claim 1 wherein said band filter includes at least two input ports and one output port, the number of input ports corresponding to the number of waveguide sets, said input ports disposed on an input side of the second waveguide grating router each for receiving said optical signal comprised of one or more of optical channels, and said output port disposed on an output side of the first waveguide grating router for outputting substantially all the optical channels carried by said optical signals in a wavelength division multiplexed format.

5. The band filter as defined in claim 4 wherein said wavelength division multiplexed format is a coarse wavelength division multiplexed format.

6. The band filter as defined in claim 1 wherein the waveguide grating, within each set of waveguides, has a grating order greater than or equal to 5 and wherein the plurality of waveguides in the waveguide grating traverse a substantially parabolic shape.

7. The band filter as defined in claim 6 wherein at least one of said at least two sets of waveguides exhibits a grating order that is different from the grating order from another one of the at least two sets of waveguides.

8. The band filter as defined in claim 1 wherein the path-length difference is substantially related to a non-zero integer multiple of an average of the center wavelengths corresponding to the adjacent waveguides.

9. The band filter as defined in claim 1 wherein the path-length difference is substantially equal to a non-zero integer multiple of an average of the center wavelengths corresponding to the adjacent waveguides, said average further divided by a refractive index representative of said adjacent waveguides.

* * * * *